United States Patent
Holmgren et al.

(10) Patent No.: US 7,327,739 B1
(45) Date of Patent: *Feb. 5, 2008

(54) ETHERNET-TO-ATM INTERWORKING TECHNIQUE

(75) Inventors: Stephen L Holmgren, Little Silver, NJ (US); David Kinsky, High Bridge, NJ (US); John Babu Medamana, Colts Neck, NJ (US); Mateusz W. Szela, Hillsborough, NJ (US)

(73) Assignee: AT&T Corporation, Bedminster, NJ (US)

(*) Notice: Subject to any disclaimer, the term of this patent is extended or adjusted under 35 U.S.C. 154(b) by 69 days.

This patent is subject to a terminal disclaimer.

(21) Appl. No.: 11/323,519

(22) Filed: Dec. 30, 2005

Related U.S. Application Data

(63) Continuation of application No. 10/016,019, filed on Dec. 12, 2001, now Pat. No. 7,113,512.

(51) Int. Cl.
*H04L 12/28* (2006.01)
(52) U.S. Cl. .................. 370/395.54; 370/466
(58) Field of Classification Search .............. None
See application file for complete search history.

(56) References Cited

U.S. PATENT DOCUMENTS

| 6,757,298 | B1 * | 6/2004 | Burns et al. ............... 370/473 |
| 7,072,346 | B2 * | 7/2006 | Hama ..................... 370/395.53 |
| 7,079,544 | B2 * | 7/2006 | Wakayama et al. ......... 370/401 |

OTHER PUBLICATIONS

Alexander et al, Large-Scale Lan Emulation Networks, IBM, pp. i-21, Jan. 1998.*

* cited by examiner

*Primary Examiner*—Frank Duong
(74) *Attorney, Agent, or Firm*—Michael Haynes PLC; Michael N. Haynes; Dale R. Jensen

(57) ABSTRACT

A network interworking facility (24) advantageously interworks Ethernet and ATM networks (22,26) having different protocols to permit the data from in one network to pass to the other and vice versa without the need for the source in to account for the protocol of the destination. Upon receipt of an information frame from the source, the Interworking facility forms a second frame of a format compatible with the destination network and including the information payload from the first frame. The interworking facility also maps the destination address incorporated in the origin frame to a corresponding destination address of a format compatible with the destination network to facilitate forwarding of the second frame to the destination.

14 Claims, 3 Drawing Sheets

ETHERNET-TO-ATM INTERWORKING TECHNIQUE

CROSS-REFERENCES TO RELATED APPLICATIONS

This application is a continuation of U.S. patent application Ser. No. 10/016,019, filed 12 Dec. 2001 now U.S. Pat. No. 7,113,512, by the same inventors and similarly titled.

TECHNICAL FIELD

This invention relates to a technique for interworking different types of data networks that have different protocols.

BACKGROUND ART

Presently, communication service providers, such as AT&T, offer high-speed Asynchronous Transport Mode (ATM) Virtual Private Network (VPN) service to customers. Each ATM-based VPN customer utilizes one or more Permanent Virtual Circuits (PVCs) to route data among different locations (endpoints), each typically located at a separate edge of an ATM network. In practice, traffic originating at an endpoint passes to an edge device on the ATM network for transmission to the network core, which in turn, transmits such traffic to an edge device serving the destination end point. While the edge devices may run one or more different protocols, including ATM or Frame Relay, the network core typically utilizes the ATM protocol. In this environment, ATM PVCs constitute a point-to-point network topology.

Currently, there exists a large embedded base of Ethernet Local Area Networks (LANs). Advances in Ethernet technology have lead to the development of Metropolitan Area Networks (MANs) that afford access to the Internet and some limited access to VPNs. Ethernet-based MANs offer significant cost advantages on a per port basis, as compared to Frame Relay and ATM networks. Many VPN customers would like the opportunity to use an Ethernet-based MAN to access their ATM-based VPNs but have not had the ability to do so because of interworking issues. The protocol associated with Ethernet is different than that associated with ATM. Ethernet is a broadcast protocol within level 2 (the data link layer) of the well-known 7-layer OSI model, whereas ATM and Frame Relay is a point-to-point circuit-type protocol within level 2. Ethernet is designated as a broadcast protocol within level 2 because information in an Ethernet network travels in both directions and passes by all devices on the path. A device that recognizes the information intended for itself (as opposed to another device) will pull the information from the network.

Thus, in the past, a customer seeking to use an Ethernet-based MAN to route traffic to a VPN served by an ATM network had to worry about both Ethernet and ATM protocols. Interconnecting these two protocols typically required a high level device like a router.

Thus, there is a need for an interworking technique that enables a customer on a first network, such as an Ethernet MAN, for example, to send information to an end point on a second network, such as an endpoint on an ATM network, without any concern as to the protocol of the network serving that endpoint. Furthermore, this technique must be able to interwork between a broadcast domain and a point-to-point circuit-based-domain.

BRIEF SUMMARY OF THE INVENTION

In accordance with one aspect of the invention, there is provided a technique for sending information form a source to a destination. The information is embodied in a payload of at least one frame sent from the source served by a first network connected by a second network to the destination. In accordance with the method, an interworking facility receives frames that are destined for the second network, each such frame destined for the second network including not only the payload, but also a destination address indicative of the endpoint in the second network destined to receive the information in the payload. The destination address is obtained by initially resolving the destinations available to the source, including those available through the second network. In practice, the interworking facility establishes a set of pseudo addresses in a format compatible with the first network that correspond to destinations in the second network so that the source can address an information frame using its own protocol for a destination that actually lies in the second network without concerning itself with the protocol employed in the second network. In the case where the first information frame comes from a source in an Ethernet-based network, the first information frame will have a Virtual Local Area Network (VLAN) tag associated with the address of the destination. On the other hand, if the information frame comes from a source in an ATM network, the frame will include a VPN Virtual Circuit Identifier (VCI), herein after referred to as a Permanent Virtual Circuit (PVC) that corresponds to the address of (e.g., the network path to) the destination in a format compatible with the ATM network, even though the destination lies in another network having a different protocol.

Upon receipt of the first information frame at the interworking facility, the facility forms a second frame compatible with the second network, the second frame including the payload. The destination address of the first frame is mapped to a second destination address compatible with the second network. Thus, for example, the VLAN tag in an originating Ethernet frame is mapped to a VPN PVC for an ATM frame and vice versa. Mapping the destination address from a format compatible with the first information frame to a format compatible with the second information frame allows routing of the second frame, including the information embodied in its payload, to the destination.

In accordance with another aspect of the invention, there is provided a technique for accomplishing address resolution for a source served by a first network to enable it to establish at least one available destination for receiving data, including a destination available through a second network having a protocol different from the first network. To accomplish such address resolution, the source broadcasts to an interworking facility an Address Resolution Protocol (ARP) polling request for the purpose of identifying each available destination, and in particular, an identifying address for that destination. Upon receipt of the ARP polling request, the interworking facility matches an identification tag in the request (e.g., the Virtual LAN Identifier tag for an ARP polling request from an Ethernet-based source) to an address for the destination in the second network (e.g., a path identifier, such as a Permanent Virtual Circuit (PVC) for an ATM-based destination). The interworking facility encodes the ARP polling request into a format compatible with the second network and transmits that request to the destination. In response, the destination replies with its address to the interworking facility that translates the destination-identifying address into a format compatible with the first network for transmission therethrough to the source. For example, in the case of an Ethernet-based source, the interworking facility encodes the ARP reply from the destination with a Media Access Control (MAC) layer address from a pool of local addresses associated with the Ethernet-based source for transmission thereto. Under such circumstances, the ARP reply would also include the IP address of the ATM-based destination and the VLAN of the Ethernet-based source.

Upon receipt of the encoded destination-identifying address, the source can thus identify the destination and send information thereto such that the destination appears as to the source as an end point on the first network. In actuality, the interworking facility acts as a proxy in the exchange between the source and destination.

DETAILED DESCRIPTION

Figure 1:
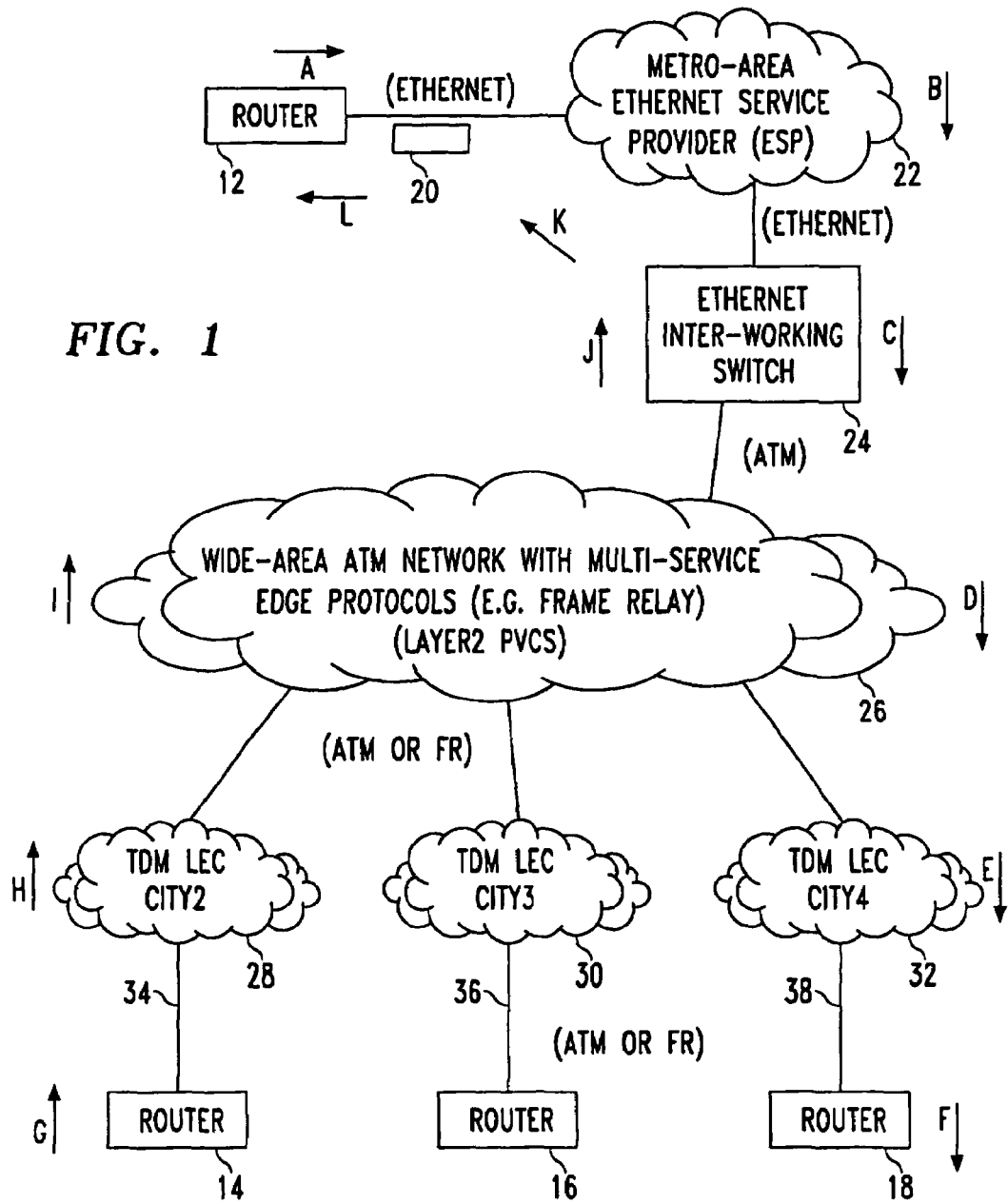
FIG. 1 depicts a block schematic diagram of a network architecture for practicing the interworking method in accordance with the present principles.

FIG. 1 depicts a block schematic diagram of a network architecture 10 in accordance with a preferred embodiment of the invention for interworking a source and destination that lie in first and second networks having different protocols to allow the source to send data using its own protocol by first establishing for the source a set of address in a format compatible with the for destinations that lie in second network, and thereafter having an interworking facility act as a proxy between networks. In the embodiment of FIG. 1, the source 12 comprises a first router and the destination, comprises one of routers 14, 16 and 18. In the illustrated embodiment, the first router 12 routes traffic, in the form of Ethernet-formatted information frames 20 (only one of which is shown), onto an Ethernet-based Metropolitan Area Network (MAN) 22 which comprises a first network. To enable transmission to one of the routers 14, 16 and 18 that lie outside the first network, the Ethernet network 22 transmits each Ethernet-formatted information frame 20 destined for one of the routers 14, 16 and 18 to an Ethernet Internet Working Switch (EIWS) 24 for transmission to a Wide Area ATM core network 26 (a second) network that serves the routers 14, 16 and 18 as discussed below. The EIWS 24 typically comprises a Ethernet switch that serves as a proxy between the Ethernet network 22 and the ATM network 26 which services a plurality of edge devices 28, 30, and 32 that utilize one of a plurality of protocols, such as ATM or Frame Relay. Each of the edge devices 28, 30 and 32 forwards traffic between ATM core network 26 and one of the destination routers 14, 16, and 18, respectively, across one of PVCs 34, 36, and 38, respectively.

Figure 2:
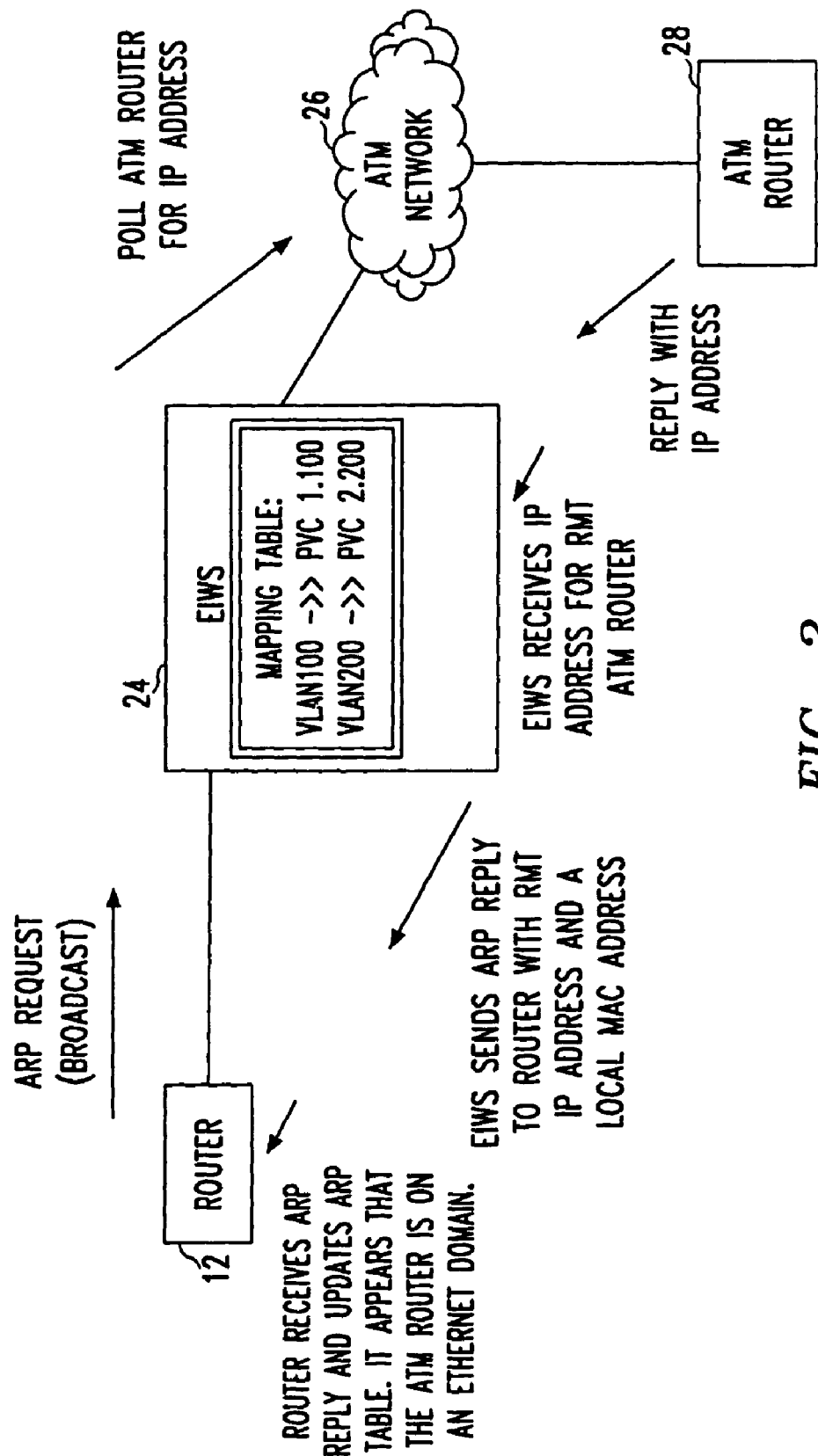
FIG. 2 depicts a block schematic diagram of a customer router and an Ethernet Interworking Switch, comprising part of the network architecture of FIG. 1, and the manner in which the EIWS acts as proxy between the Ethernet domain and the ATM domain.

FIG. 2 illustrates the manner in which EIWS 24 acts as an Ethernet Address Resolution Protocol (ARP) proxy for the ATM domain that serves the edge routers 28, 30 and 32 to initially resolve the protocol disparity between the networks 22 and 26 to subsequently permit transmission of frames from the router 12 to one of the routers 14, 16 and 18 (all of FIG. 1) and vice versa. To resolve the protocol disparity, the router 12 first floods an ARP polling request in the form of a packet to determine which destinations are on the Ethernet network 22 directly as well as which destinations (e.g., the routers 14, 16 and 18 of FIG. 1) are available through the ATM network 26. The EIWS 24 receives the ARP polling request and opens the packet to determine the Virtual Local Area Network (VLAN) tag embodied in the packet for the purpose of matching the VLAN tag to a path (i.e., a PVC) in the ATM network 26. To match the VLAN tag to an ATM PVC, the EWIS 24 uses a VLAN to PVC mapping table. The EWIS 24 then sends an ATM-encoded packet out the PVC through the ATM network 26 to the destination ATM router 28. The ATM router 28 receives the polling request and responds back across the same PVC to the ATM network 26 with the IP address of the router formatted as an IP packet. The ATM network 26 forwards this packet to the EIWS 24, which then opens the packet, and obtains the IP Address for the remote ATM edge device 28. The EIWS 24 then encodes an ARP reply for the source with an Ethernet Source MAC Address from a locally available pool of Addresses. The ARP reply also contains the IP Address from ATM router 28 of the destination router 14. Furthermore, the ARP reply is encoded with same VLAN that came from router 12. Router 12 receives the ARP reply and updates its ARP table. At this point, the router 12 believes that ATM router 28 is directly connected to its own Ethernet port. However, in actuality, the EIWS 24 acts as a proxy in this exchange. The router 12 would follow the same method to resolve the address of the edge devices 30 and 32 and the routers 16 and 18, respectively, served thereby. Having resolved the addresses, the EWIS 24 can then facilitate the actual transmission of data from the router 12 to one of the routes 14, 16 and 18 as described below. Although not described, each of the ATM routers 28, 30 and 32 would resolve the destination address for information frames sent to the router 12 in a comparable manner.

Figure 3:
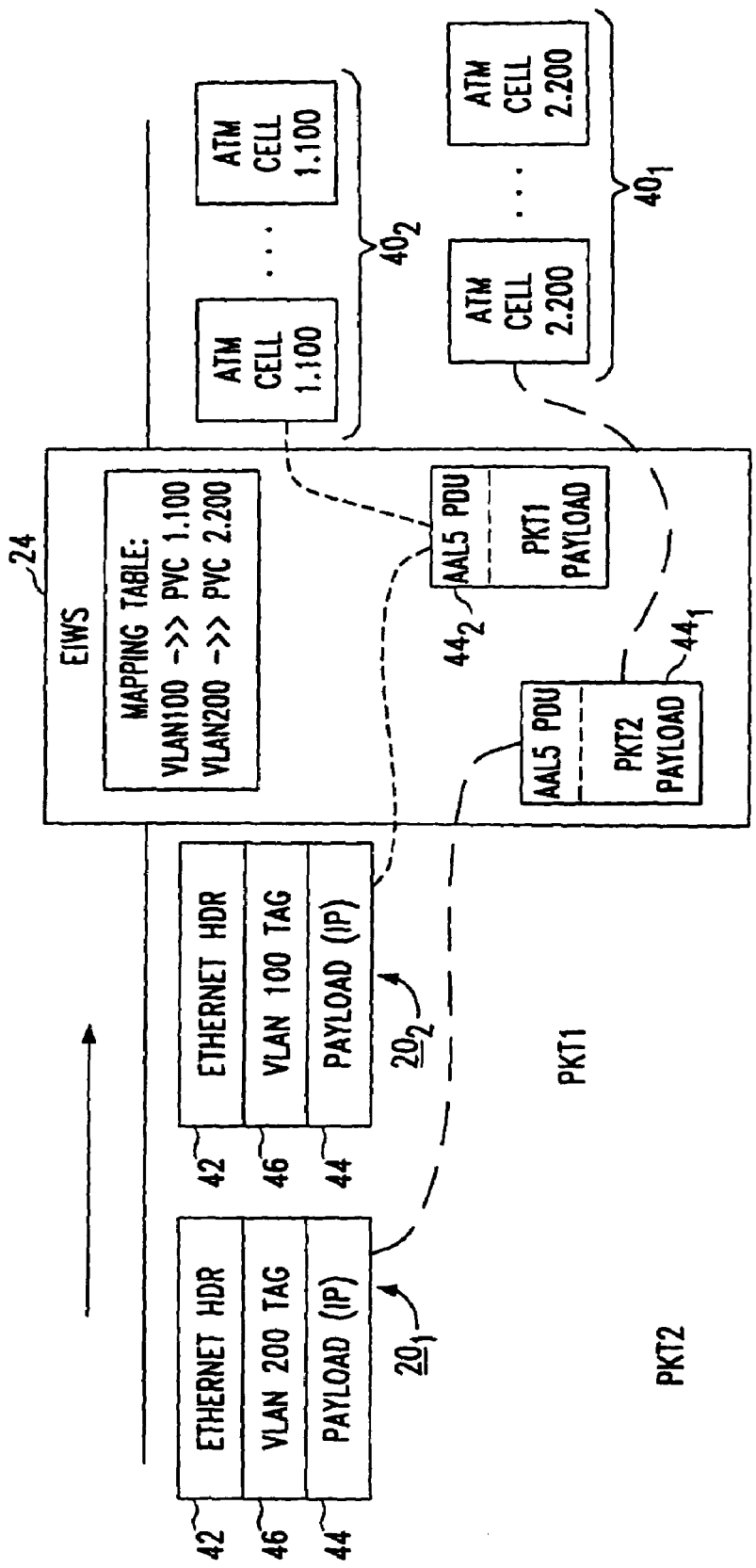
FIG. 3 depicts a block schematic diagram of an Ethernet Interworking Switch, comprising part of the network architecture of FIG. 1, and the manner in which the switch maps destination addresses from one format to another.

FIG. 3 best illustrates the manner in which the EIWS 24 operates to interwork the Ethernet-based MAN 22 with the ATM network 26 (both of FIG. 1) to facilitate the actual transmission of data following the initial address resolution discussed above with respect to FIG. 2. The EIWS 24 enables the transmission of information embodied in the payload of each of a plurality of Ethernet-formatted information frames, illustratively represented by frames $20_1$ and $20_2$, by forming corresponding ATM cell sequences, illustratively represented by ATM cell sequences $40_1$ and $40_2$ respectively. Each Ethernet formatted information frame received at the EIWS 24, such as frame $20_1$ includes an Ethernet header 42, a payload 44 and a VLAN tag 46. The Ethernet header 42 contains certain administrative data, such as the identity of the source of the frame (the Ethernet source MAC Address) and the identity of the destination (the Ethernet destination MAC Address). The payload 44 contains the information of interest (e.g. a IP packet), whereas the VLAN tag 46 contains the endpoint destination address, in the form of a sub-interface on the router 12 associated with a corresponding one of the destination routers 14, 16, and 18 of FIG. 1. The Ethernet destination MAC Address must be for the EIWS 24 and the EIWS must act as a proxy for the ATM portion of the end-to-end interconnection. The VLAN tag provides the ability to reach the ATM endpoint. Unfortunately, the address embodied in the VLAN tag 46 has no meaning to the ATM network 26 and thus, the ATM network could not by itself readily forward the frame $20_1$ to one of the destination routers 14, 16, and 18.

In accordance with present principles, the EIWS 24, upon receipt of an Ethernet formatted frame, such as frame $20_1$, first determines whether the frame is destined for an endpoint served by the ATM network 26, such as one of the routers 28, 30, and 32 of FIG. 1, based on the address specified by the VLAN tag 46 of FIG. 2 in that Ethernet-formatted frame. If the frame $20_1$ is indeed destined for such an endpoint, then the frame requires interworking, where-upon, the EIWS 24 then removes the both Ethernet header 42 and the VLAN tag 46 from the frame, leaving just the Ethernet payload 44 which is nothing more than an IP Packet. The EIWS 24 then forms ATM AAL5 Frame 44$_1$ that includes this payload (the IP packet).

The EIWS 24 then determines the destination address for the AAL5 Frame 44$_1$ (i.e., the appropriate ATM PVC, such as one of the PVCs 34, 36 and 38 of FIG. 1 serving the routers 14, 16 and 18, respectively) by mapping the VLAN tag to a corresponding PVC via a mapping table 46 that cross-references VLAN addresses to corresponding ATM PVCs. By mapping the VLAN tag 46 to the corresponding ATM PVC, the EIWS 24 effectively converts the Ethernet address into an ATM address. The EIWS 24 then breaks down the AAL5 frame 42 in a corresponding sequence of ATM cells, such as cell sequence 40$_1$, for transmission to the ATM network 26. In a similar fashion, the EIWS 24 will remove the Ethernet header 42 and VLAN tag 46 from a subsequent Ethernet-formatted frame 20$_2$ and encapsulate its payload 44 into another AAL5 frame 44$_2$. The EIWS 24 then maps the VLAG tag of the frame 20$_2$ to a corresponding PVC to yield a subsequent ATM cell sequence 40$_2$.

The ATM network 26 receives the ATM cell sequences 40$_1$ and 40$_2$ and transmits them to the appropriate destination (i.e., the corresponding one of endpoint routers 14, 16 and 18 served by the edge devices 28, 30 and 32, respectively), based on the PVC value obtained from the mapping performed by the EIWS 24. Upon receipt of an ATM cell sequence, the endpoint router, e.g., endpoint router 14, knows that the cell sequence contains an AAL5 payload. After removing the administrative information from the ATM cell sequence, the endpoint router is left with the payload in the form of an IP Packet. At that time, the endpoint router (e.g. router 14) makes a routing decision based on it's own routing table. In the illustrative embodiment of FIG. 1, the endpoint routers 14, 16, and 18 all believe that they are connected to an ATM network that serves the source router 12 rather than Ethernet MAN 22 which actually serves the source router.

In addition to interworking Ethernet frames to ATM frames, the EIWS 24 also interworks ATM frames to Ethernet frames. One or more of the endpoint routers 14, 16, and 18 may originate a sequence of ATM cells that embody a payload containing information of interest that is ultimately destined for the router 12. Such ATM cell sequences originated by one of the routers 14-18 will include a VPN PVC that serves as the ATM address for the router 12. Thus, the sending router (e.g., router 14) perceives the receiving router 12 as an ATM router despite its actual status as an Ethernet router. The sequence of ATM cells from the sending router 14 passes to the corresponding edge router (e.g., router 28) for forwarding to the ATM core network 26 and subsequent transmission to the EIWS 24.

The EIWS 24 receives the ATM cell sequences and translates them into usable Ethernet frames by essentially reversing the process previously. The EIWS 24 receives each ATM cell sequence and then maps the VPN PVC information therein to a corresponding VLAN tag using the table 46. The EIWS 24 then combines each cell sequence to reassemble the AAL5 payload and thereafter strips out the AAL5 administrative information to yield the remaining payload, which is inserted into an Ethernet Frame with the specified VLAN tag. The EIWS 24 then forwards the Ethernet frame (including the appropriate VLAN tag 26) to the Ethernet-based MAN for transmission to the router 12. When constructing the Ethernet Frame, the MAC Address of Router 12 must be inserted in the Ethernet Destination MAC Address field. The Source MAC Address must be provided as a proxy function by the EIWS as depicted in FIG. 2.

Router 12 receives the VLAN-tagged Ethernet frame and strips the Ethernet header 42 and the VLAN tag 46, leaving the payload 44 comprising an IP Packet. Router 12 then makes a routing decision based on its own routing table. In this way Router 12 receives an Ethernet Frame that it believes were originated from an Ethernet-based router, notwithstanding the fact that the sending Router 14 for example is actually connected via an ATM or Frame relay link to a corresponding edge router 28.

The foregoing describes a technique for interworking different types of data networks that have protocols and different addressing schemes.

The above-described embodiments merely illustrate the principles of the invention. Those skilled in the art may make various modifications and changes that will embody the principles of the invention and fall within the spirit and scope thereof.

The invention claimed is:

1. A method for communicating information embodied in a payload of an Ethernet-formatted frame from a source served by a first network and destined for at least one destination served by a second network, comprising the steps of:

from an Ethernet destination Media Access Control (MAC) address comprised by the Ethernet formatted frame, resolving via an interworking facility an identifying address for the destination, the Ethernet destination Media Access Control (MAC) address encoded for the source by the interworking facility in an Address Resolution Protocol (ARP) reply from the at least one destination, the Ethernet destination Media Access Control (MAC) address chosen from a locally available pool of Addresses by the interworking facility;

receiving the Ethernet-formatted frame at the interworking facility, the Ethernet-formatted frame also including a Virtual Local Area Network (VLAN) Tag wherein the tag specifies in a first format the identifying address for destination in the second network;

forming a second frame having a second format compatible with the second network and including the payload; and mapping the address specified in the VLAN tag to a second destination address that is of the second format to enable transmission of the second frame to the destination through the second network using the second destination address.

2. The method according to claim 1 wherein the second frame has an Asynchronous Transport Mode (ATM) format and wherein the identifying address of the destination comprises an ATM Virtual Private Network (VPN) Permanent Virtual Circuit (PVC).

3. The method according to claim 1 wherein the mapping step further comprises the step of mapping the VLAN tag to an Asynchronous Transport Mode (ATM) Permanent Virtual Circuit (PVC).

4. A method for communicating information embodied in a payload of a first ATM-formatted frame, originating at a source served by a first network, to at least one destination served by a second network having a broadcast protocol, comprising the steps of:

resolving via an interworking facility an identifying address for the destination;

receiving at the interworking facility a frame that also includes a first destination address in a form of an ATM Virtual Private Network (VPN) Permanent Virtual Circuit (PVC) specifying the identifying address for the destination in a first format;

forming a second frame of a second format compatible with the second network, the second frame including the payload, the second frame comprising a source address that the interworking facility determines based upon a prior Address Resolution Protocol (ARP) reply from the destination; and mapping the first destination address into a second destination address in the second format to enable routing of the second frame to the destination.

5. The method according to claim 3 wherein the second frame has an Ethernet format and wherein the second destination address comprises the Virtual Local Area Network (VLAN) tag within the Ethernet-formatted first frame.

6. The method according to claim 4 wherein the mapping of the first destination address to the second destination address comprises the step of mapping the ATM VPN Virtual Circuit Identifier (VCI) to a Virtual Local Area Network (VLAN) tag and creating an Ethernet frame.

7. A method for communicating information from a source to a destination, the source served by a first network and the destination served by a second network, the first and second networks having a separate one of a broadcast layer 2 and point-to-point circuit-type layer 2 protocol, comprising the steps of:

receiving at an interworking facility a first frame which includes a payload and a first destination address in a first format compatible with said first network, the first destination address established by the interworking facility by resolving destinations available to the source through the second network;

forming a second frame of a second format compatible with the second network, the second frame including the payload, the second frame comprising at least one source address and a destination address that the interworking facility determines bases upon a prior Address Resolution Protocol (ARP) reply from the destination; and mapping the first destination address to a second destination address specifying in the second format the address of the destination in the second network so that the second network, upon receipt of the second destination address, can route the second frame to the destination.

8. The method according to claim 7 wherein the first frame has an Ethernet format and wherein the first destination address comprises a Virtual Local Area Network tag within the Ethernet-formatted first frame.

9. The method according to claim 1 wherein the second frame has an Asynchronous Transport Mode (ATM) format and wherein the second destination address comprises an ATM Virtual Private Network (VPN) Permanent Virtual Circuit (PVC).

10. The method according to claim 7 wherein the second frame has an Asynchronous Transport Mode (ATM) format and wherein the second destination address comprises an ATM Virtual Private Network (VPN) Permanent Virtual Circuit (PVC).

11. The method according to claim 10 wherein the mapping of the first destination address to the second destination address comprises the step of mapping the VLAN tag to the ATM VPN PVC.

12. The method according to claim 7 wherein the first frame has an Asynchronous Transport Mode (ATM) format and wherein the first destination address comprises an ATM Virtual Private Network (VPN) Permanent Virtual Circuit (PVC).

13. The method according to claim 12 wherein the second frame has an Ethernet format and wherein the second destination address comprises a Virtual Local Area Network (VLAN) tag within the Ethernet-formatted first frame.

14. The method according to claim 13 wherein the mapping of the first destination address to the second destination address comprises the step of mapping the ATM VPN PVC to the VLAN tag.

* * * * *